(12) United States Patent
Nakagawa et al.

(10) Patent No.: US 7,210,104 B2
(45) Date of Patent: Apr. 24, 2007

(54) INFORMATION DISPLAY METHOD AND INFORMATION DISPLAY SYSTEM FOR FINDING ANOTHER USER IN A PLURALITY OF USERS BASED UPON REGISTERED INFORMATION

(75) Inventors: Teruhiko Nakagawa, Tokyo (JP); Shoichiro Kanazawa, Tokyo (JP)

(73) Assignee: Sega Corporation (JP)

( * ) Notice: Subject to any disclaimer, the term of this patent is extended or adjusted under 35 U.S.C. 154(b) by 607 days.

(21) Appl. No.: 09/781,996

(22) Filed: Feb. 14, 2001

(65) Prior Publication Data
US 2001/0020955 A1   Sep. 13, 2001

(30) Foreign Application Priority Data
Feb. 16, 2000   (JP) ............................. 2000-037392

(51) Int. Cl.
*G06F 3/00* (2006.01)

(52) U.S. Cl. .................................... 715/757

(58) Field of Classification Search ................ 345/706, 345/718, 733, 745, 753, 757–758, 848–852, 345/744, 746–747, 751; 705/26–27; 709/200–207; 715/751, 757, 753, 758
See application file for complete search history.

(56) References Cited

U.S. PATENT DOCUMENTS

| | | | | |
|---|---|---|---|---|
| 5,736,982 A | * | 4/1998 | Suzuki et al. ............... | 345/706 |
| 6,329,986 B1 | * | 12/2001 | Cheng ......................... | 345/419 |
| 6,396,509 B1 | * | 5/2002 | Cheng ......................... | 345/706 |
| 6,476,830 B1 | * | 11/2002 | Farmer et al. .............. | 345/769 |
| 6,954,728 B1 | * | 10/2005 | Kusumoto et al. ............. | 705/1 |
| 7,011,582 B1 | * | 3/2006 | Yamamoto ................... | 463/31 |

* cited by examiner

*Primary Examiner*—Kristine Kincaid
*Assistant Examiner*—Thanh Vu
(74) *Attorney, Agent, or Firm*—Dickstein Shapiro LLP

(57) ABSTRACT

A virtual space including a model in place of each user is displayed on a terminal of a user. About an item in which the user is interested, the level of interest is previously registered so that the figure of a model of the other user can vary depending on the level of the interest. For example, about a certain interesting item, if the other user is also interested in that item, the user's terminal screen provides a display of the other user's model differently from the ordinary figure of the model. If not interested, then it is displayed as the ordinary model. Thus, the user can readily find out a user he/she wants to meet.

10 Claims, 17 Drawing Sheets

FIG. 4

Registration

☐ Generic new registration (Persons not having sales purpose)

☐ Sales new registration (Persons having sales purpose)

☐ Renewal of already made registration (Common to generic and sales purpose)

User ID [ ]

Password [ ]

[Return] [Next]

FIG. 5

Item setting

| Fashions | Sports | Automobile · Motorbike | Foods |

Item retrieval [ ] [Go]

[Return]

FIG. 7A

Bags

- ☐ Visual level  [     ]  (0~5)
- ☐ To carry bag
- ☐ Sales level   [     ]  (0~5)

[Icon position]   [Select bag]

[Return] [Proceed]

*Non-display of bags*

FIG. 7B

Icon position
- ☐ To carry by left hand
- ☐ To carry by right hand
- ☐ To replace with head

[OK] [Cancel]

FIG. 7C

Type of bags

○  ○
○  [Tie-up brand]

[OK] [Cancel]

FIG. 7D

Tie-up brand

| GUCCI | [     ] |
| LV    | [     ] |
| PRADA | [     ] |

[OK] [Cancel]

FIG. 8

| Own visual level | How the other user's model is seen | How own model is seen by the other user |
|---|---|---|
| 0 | 0~5 | 0~5 |
| 1 | 0~1   2~4   5 | Ditto |
| 2 | Ditto | 0   1~5 |
| 3 | 0~1   2~3   4~5 | Ditto |
| 4 | Ditto | 0   1~2   3~5 |
| 5 | Ditto | 0   1~5 |

FIG. 11

| Extraction condition setting | |
|---|---|
| Sales target item | |
| Extraction level | ◎0 ◎1 ◎2 ◎3 ◎4 ◎5 |
| Sales level | ◎0 ◎1 ◎2 ◎3 ◎4 ◎5 |
| | OK  Cancel |

FIG. 13

| | List preparation | | | | | | |
|---|---|---|---|---|---|---|---|
| Sales target item | | | | | | | |
| Extraction level | ◎0 | ◎1 | ◎2 | ◎3 | ◎4 | ◎5 | |
| Sales level | ◎0 | ◎1 | ◎2 | ◎3 | ◎4 | ◎5 | |
| | | | | | OK | Cancel | |

FIG. 15
| User information list-item "Bag" | | | |
|---|---|---|---|
| Name | Visual level | Sales level | |
| User A | 3 | 2 | |
| . | . | . | |
| . | . | . | |
| . | . | . | |
| . | . | . | |
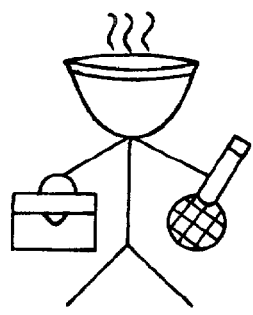
FIG. 16A
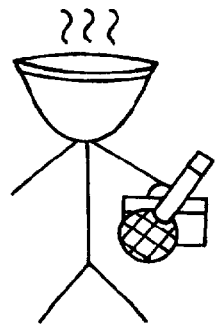
FIG. 16B
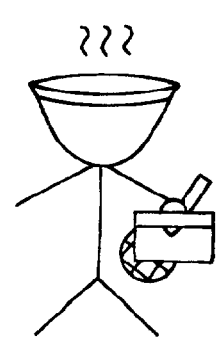
FIG. 16C

INFORMATION DISPLAY METHOD AND INFORMATION DISPLAY SYSTEM FOR FINDING ANOTHER USER IN A PLURALITY OF USERS BASED UPON REGISTERED INFORMATION

BACKGROUND OF THE INVENTION

1. Field of the Invention

The present invention relates generally to a method for displaying information registered in a data base on a computer terminal via a computer network, and more particularly, to a display method in the case where a virtual space sharable by a plurality of users is displayed on a screen of the computer terminal of each user.

2. Description of the Related Art

In recent years, a virtual space shared by computer users is provided in a computer network. When the user accesses the virtual space from a computer terminal via the network, the virtual space is displayed on a terminal screen. For example, a town is formed within the virtual space, and a three-dimensional model in place of the user registered previously exists there among. The model maybe, for example, a man figure, and may be a preferable animal figure.

The user operates the own terminal while viewing the screen, and can move the own model within the virtual space. The own model is brought into contact with another model within the virtual space, whereby the user can communicate with a user of another model by use of a chat or electronic mail. In this manner, the user can encounter the strange user by utilizing the virtual space, and communicate therewith.

However, the user encountered accidentally within the virtual space does not always have the common hobby or interest. In other words, in the case where the user desires to come upon a user having the common hobby and interest, it is very difficult to find out such users.

SUMMARY OF THE INVENTION

It is therefore the object of the present invention to provide an information display method for displaying information for easily finding out another user in conformity with a user's object of access, in a virtual space displayed on a terminal; and a system for executing the same.

In order to achieve the above object, according to a first aspect of the present invention there is provided an information display method for displaying information about a plurality of users registered in a server, on a terminal of a user of the plurality of users, via a communication network, the method comprising the steps of transferring information about the plurality of users from the server to the terminal of the user; and differently displaying display contents of the information about each user displayed on the terminal of the user on the basis of registration contents of information about the user.

Preferably, the information about each user includes a file for describing a model in place of each user within a virtual space shared by the plurality of users, the virtual space where the model corresponding to each user exists being displayed on the terminal of the user.

Preferably, the information about each user contains an interest level of each user about at least one item, and the figure of the model at the level of each user being differently displayed based on the level of the user about the item.

More specifically, about an item in which a user is interested, the level of interest is previously registered so that the figure of a model of the other user can vary depending on the level of the interest. For example, about a certain interesting item, if the other user is also interested in that item, the user's terminal screen provides a display of the other user's model differently from the ordinary figure of the model. If not interested, then it is displayed as the ordinary model. Thus, the user can readily find out a user he/she wants to meet.

Preferably, at least one model of a virtual character prepared by the server exists within the virtual space.

Preferably, the information about the plurality of users is retrieved according to predetermined extraction conditions set by the user so that a user meeting the extraction conditions is extracted.

Preferably, the model corresponding to the extracted user is displayed, and the model corresponding to the unextracted user is not displayed.

The information about the extracted user(s) may be displayed as a list.

Preferably, the user may set the extraction conditions in the case where the user has in advance a specified permission from a manager of the server.

Preferably, the user may set the extraction conditions in the case where the user has in advance a permission of sales activities within the virtual space from the manager of the server.

The manager of the server may charge to the user for the setting of the extraction conditions by the user.

Preferably, the extracted user may charge to the user for communicating with the user within the virtual space.

In the case where the extracted user may charge to the user for displaying the list including information about the extracted user.

In order to achieve the above object, according to a second aspect of the present invention there is provided an information display system having a server registering information about a plurality of users, and at least one terminal connected to the server via a communication network, the terminal being of a user of the plurality of users for displaying information about the plurality of users, wherein the server transfers information about the plurality of users to the terminal of the user, and the terminal for the user differently displays display contents of information about each user on the basis of registration contents of information about the user.

In this case, the information about each user may include a file for describing a model in place of each user within a virtual space shared by the plurality of users, and the virtual space where the model corresponding to each user exists may be displayed on the terminal of the user.

BRIEF DESCRIPTION OF THE DRAWINGS

FIG. 4 is an example of an initial screen of a user information registration;

FIG. 5 is an example of a screen of an item registration;

FIGS. 7A–7D are examples of screens of visual level setting;

FIG. 8 is a diagram for explaining visual levels;
FIG. 11 is an example of an extraction level setting window;
FIG. 13 is an example of a list preparation window;
FIG. 15 is an example of a model information list;
FIGS. 16A–16C are diagrams for explaining a display of a plurality of item icons.

DESCRIPTION OF THE PREFERRED EMBODIMENTS

Preferred embodiments of the present invention will now be explained. However, a technical scope of the present invention is not limited to the embodiments. Incidentally, in this embodiment, a virtual space is constructed on the Internet and is described by a so-called VRML (Virtual Reality Modeling Language) which. The VRML is a language standardized for describing a three-dimensional model, and there is presently proposed the VRML having a multi-user function in which the virtual space can be shared by a plurality of users, and the plurality of users can enter thereinto.

Figure 1:
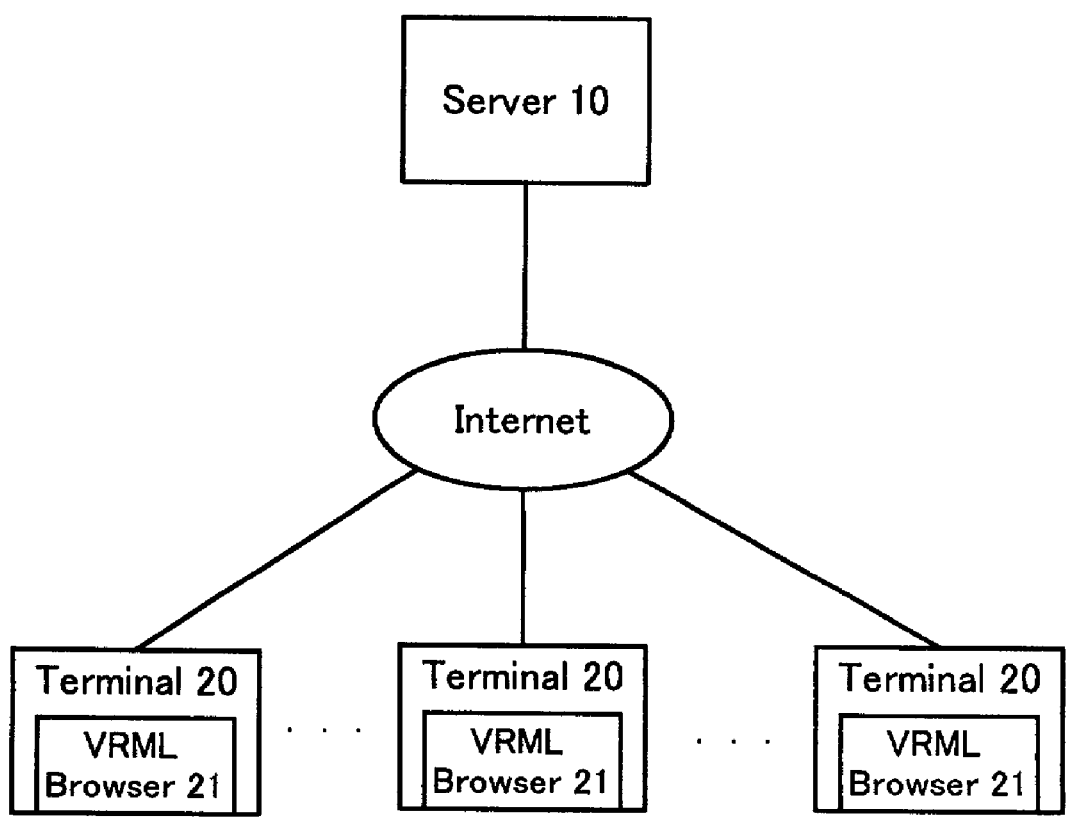
FIG. 1 is a diagram showing an example of the configuration of a computer network according to an embodiment of the present invention.

FIG. 1 is a diagram showing a configurational example of a computer network according to the embodiment of the present invention. In FIG. 1, a server 10 and a plurality of client terminals 20 are connected to the Internet through a telephone line, for example. The server 10 stores a VRML file describing the virtual space and various files for explaining below. For example, in a computer gaming apparatus installed in a personal computer, a game arcade, or the like, each terminal 20 is provided with a controller constituted by a CPU, or the like, a display unit such as a CRT display, a liquid crystal display, or the like, and an input unit such as a key board, a mouse, or the like.

The terminal 20 is installed with an internet browser, and a VRML browser 21. The VRML browser 21 displays the virtual space described by the VRML file sent from the server 10 on the display unit of the terminal 20.

Figure 2A:
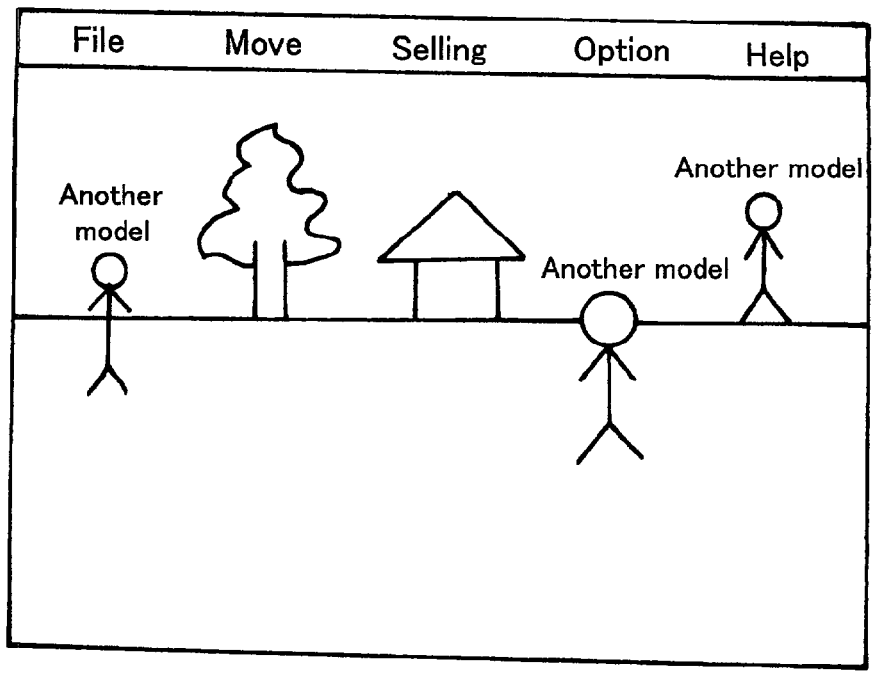
FIGS. 2A and 2B are a display example of a virtual space.
Figure 2B:
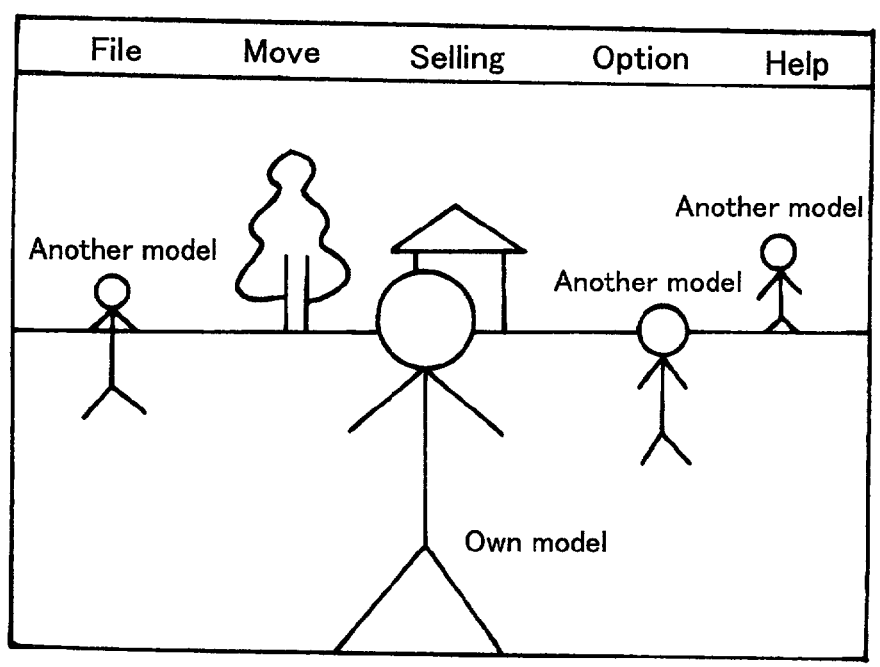

FIGS. 2A and 2B are examples of images of the virtual space displayed on the display unit of the terminal 20. As shown in FIG. 2A, on the display unit of the terminal 20, the images of the virtual space as viewed from a visual point of a model as a substitute within the virtual space of a user of each terminal 20 are displayed. In the case of FIG. 2A, the images of the own model itself are not displayed, and the model of another user is displayed within the virtual space. However, the visual point may be switchable. For example, when the visual point is switched to the rear of the own model, as shown in FIG. 2B, the rear figure of the own model is also displayed. Various towns are constituted in the virtual space, and for example, a district like a shopping mall is also constituted. The user makes the model go to the shopping mall, so that the user can do so-called Internet shopping.

Furthermore, the VRML browser 21 has a navigation control function so that the user's model of the terminal 20 can move to arbitrary directions in the virtual space. Furthermore, the VRML browser 21 has such a multi-user function that the plurality of users share the same virtual space. It is possible that each of the plurality of users can enter into the same virtual space as the model by this multi-user function. The models come across each other within the virtual space, whereby the users can make communication such as a chat, or the like with each other in the virtual space. The contact is recognized by the VRML browser 21 by overlapping coordinates of the two models in the virtual space, or entering a mutual distance into a predetermined one. When the VRML browser 21 recognizes the contact, the VRML browser 21 transmits the possibility of communication to the user by displaying information of the contacted model of another user (for example, its name), etc. The user uses a chat window, or the like, so that the user can call to the other user via the Internet.

Figure 3:
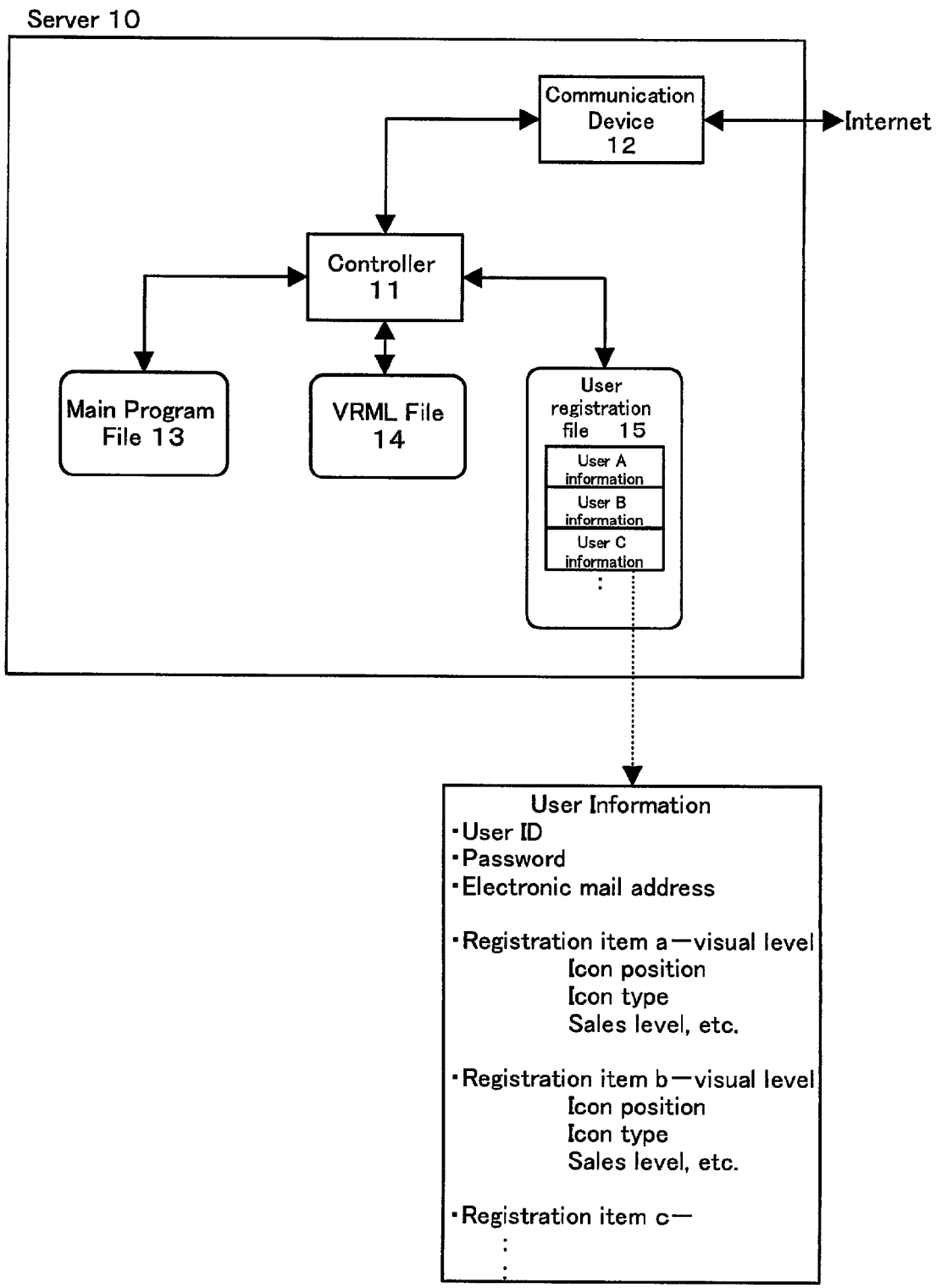
FIG. 3 is a diagram showing an example of the configuration of a server 10.

FIG. 3 is a diagram showing an example of the configuration of the server 10. A controller 11 includes a CPU. The controller 11 executes write and read control of data, transfer control of data, control of each unit in the server 10, various calculation processings, and stores temporarily data, and the like. For example, a communication device 12 receives data from the terminal 20, and transfers them to the controller 11, and also transmits the data transferred from the controller 11 to the terminal 20. Furthermore, the below files are stored in a predetermined memory unit in the server 10.

A main program file 13 has a program for reading various files and transferring them to the terminal 20, a program for processing the data from the terminal 20, a program for retrieving files, and the like.

A VRML file 14 is a file describing the virtual space by the VRML having a multi-user function.

A user registration file 15 is a database registering information of the user accessing the virtual space. The user information of each user has, as illustrated, basic information such as a user ID, a password, an electronic male address and the like, and additionally a visual level, an icon position, an icon type, a sales level, and the like in each item registered by each user. The user information is in detail described below together with the description of the registration procedure. Incidentally, the controller 11 prepares information of the model corresponding to each user by the VRML based on the user information registered in the user registration file 15, and stores it in a VRML file 14.

FIGS. 4 to 7 are examples of registration screens of the user information. First, each user accesses the internet, and passes through a top screen of HOMEPAGE of a company presenting the virtual space, and opens an initial screen of a user information registration shown in FIG. 4. In FIG. 4, in the case where the user registers first, the user selects a "general registration." Furthermore, in the case where the user has been already registered and renews the registered information, the user selects a "renewal of registration already made," and also inputs an ID and password registered, and proceeds to a next screen. Furthermore, as described below, in the case where the virtual space according to this embodiment is exploited as (commercial) sales, the user selects a "sales registration" described below.

Figure 6:
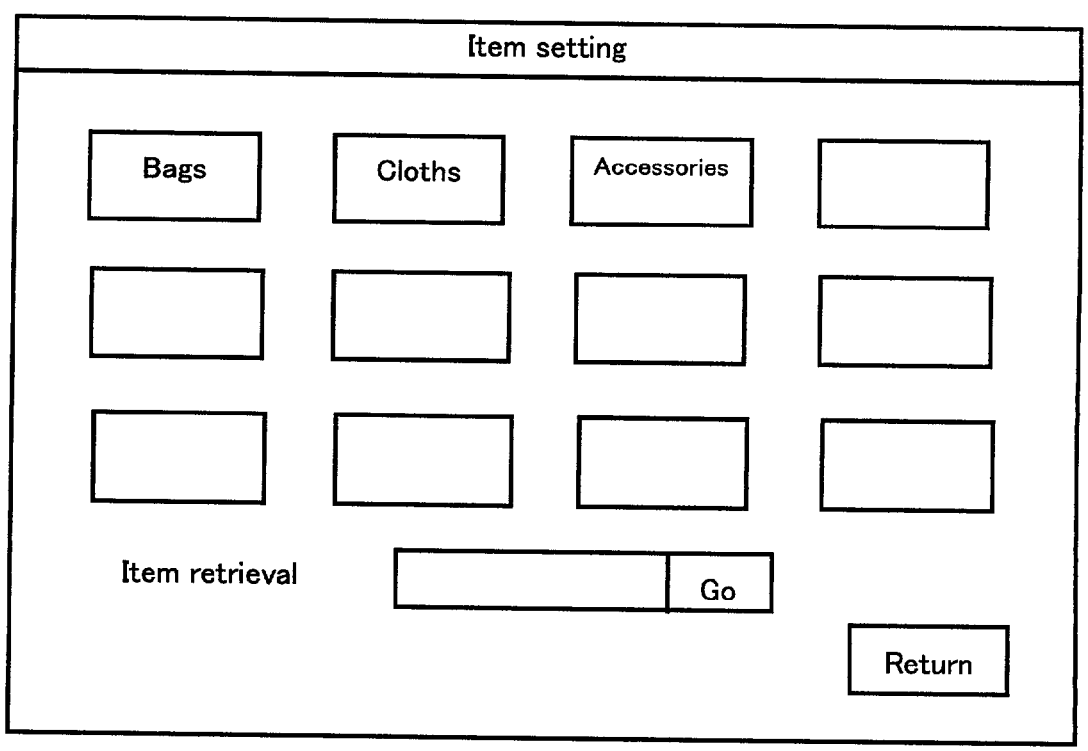
FIG. 6 is an example of the screen of the item registration.

First, when a user's name, an electronic mail address, and the like are registered in accordance with the screen, a user ID and password are given. Succeedingly, an item setting screen shown in FIG. 5 is displayed. The items are assorted finely into various fields of the user's hobbies and interests. FIG. 5 is a screen example showing big items, and the big items are assorted into, for example, "fashions", "sports", "automobiles, motorbikes", "foods", and the like. For example, when the user selects "fashions" out of the big items, a screen of small items shown in FIG. 6 is displayed. The small items of FIG. 6 are assorted into "bags", "cloths", "trousers and skirts", "accessories", and the like. When the user selects one of the small items (for example, "bags"), each of visual level setting screens of FIG. 7 is displayed.

In FIG. 7A, "visual levels" are characteristic in the present invention, and the models corresponding to the other users in the visual space according to the visual levels are differently displayed. The visual level is a level showing the degree of interests for the selected items, and according to this embodiment, the levels are assorted into, for example, 6 stages. It is indicated that level 0 is lowest in the interests, and level 5 is highest in the interests. Furthermore, in the initial settings, the visual levels in all items are set to "0".

Incidentally, in addition to the visual level explained below, the user can establish various levels such as cloths of the model in accordance with the registration screen.

FIG. 8 is a diagram for explaining the visual levels. FIG. 8 shows an example of a figure of the model in the visual space corresponding to the visual level. In FIG. 8, the visual levels about the item "bags" will be explained as the example. First, in the case where the visual level in own "bags" of the user viewing the visual space displayed on the terminal screen is "0" (in the case where the user is not entirely interested in the bags), regardless of the visual level in "bags" of each model of the other user existing in the visual space (even if the visual level in "bags" is "0" or "5"), the figure of the model displayed on the terminal screen of the user is still a normal figure (for example, a man's figure). In this manner, in the case where the visual level in the own "bags" is "0", the model's figure of the other user displayed on the screen is not changed in "bags".

In the case where the own visual level is "1" or "2", as shown in FIG. 8, when the visual level of the other user's model is "0" or "1", the model's figure of the other user is still seen as a normal figure. As the model of the visual level "0" is not entirely interested in "bags", the model's figure is not changed as described above. Furthermore, the model of the visual level "1" is interested a little bit in "bags", but it is a level in the case where the degree of interests is not desired to be informed the other user thereof, and the model's figure of the visual level "1" is also still displayed as the normal figure.

Furthermore, when the model's visual level of the other user is "2", "3", or "4", as illustrated, for example, the model is displayed after the head is replaced with an item icon. Furthermore, when the model's visual level of the other user is a supreme "5", for example, the bag replaced with the head is lit and displayed. In this manner, in the case where the visual level at a seeing side (own side) is "1" or "2", when the visual level of the other user's model which is being displayed (watched) is "2" or over, the figure of the model is changed, and when the visual level is a supreme level "5", the changed figure is further emphasized.

In the case where the own visual level is "3", "4", or "5", when the model's visual level of the other user is "0" or "1", in the same manner as in the case where the visual level is "1" or "2", the model's figure is displayed still as the normal figure. When the model's visual level of the other user is "2" or "3", the model is displayed after the head is replaced with an item icon. Furthermore, when the visual level in "bags" of the model of the other user is "4" or "5", for example, the bag which is replaced with the head is lit and displayed. Namely, in the case where the visual level at a seeing side (own side) is "3", "4", or "5", when the visual level of the other user' model which is displayed (watched) is "2" or over, in the same manner as in the case where the visual level at the seeing side is "1" or "2", the model's figure is changed, but differing from the case where the visual level at the seeing side is "1" or "2", when the visual level is "4" or "5", the changed figure is further emphasized.

Incidentally, the visual levels "1" and "2" are same in how the model of the other user is seen, but how to be seen from the other user is different. Namely, as illustrated, in the case where the own visual level is "1", the figure of the own model is not changed but seen as the normal one when viewed from the other user of any one of the visual levels "0" to "5." On the other hand, in the case where the own visual level is "2", the figure is seen in the model of the normal one from the other user of the visual level "0", but seen as the changed figure from the other user of the visual levels "1" to "5" other than "0". Namely, the visual level "2" is a level in the case where the interest level is at the substantially same degree as in the visual level "1", but the user desires to inform the other user of being interested in it.

Furthermore, in the case where the own visual level is "3", "4", and "5" also, how to see the model of the other user is same, but how the own model is seen from the other user is different. Namely, in the case where the own visual level is "3", the model is seen as the normal figure from the other user of the visual level "0", but seen as the changed figure from the other user of the visual levels "1" to "5" other than "0". Incidentally, how the model is seen at the visual level "3" is same as in the visual level "2", but as described above, how to see is different. This is because, as the interest level of the visual level "3" is higher than that of the visual level "2," the model having the visual level "4" which is relatively high is set to be seen as the emphasized changed figure, and it is easy to find out the model of the other user who is relatively high interested in "bags".

Furthermore, in the case where the own visual level is "4", the model is seen as the normal figure from the other user of the visual level "0", and is seen as the changed figure from the other user of the visual levels "1" and "2", and further is seen as the emphasized changed figure from the other user of the visual levels "3", "4", and "5". Accordingly, in the visual level "4", it is possible to appeal more strongly the interest in "bags" with respect to the model of the visual level "3" or more which is relatively high interested in "bags." Furthermore, in the case where the own visual level is "5", the model is seen as the normal figure from the other user of the visual level "0", but seen as the emphasized changed figure from the other user of the visual levels "1" to "5" other than "0". Accordingly, the visual level "5" can appeal widely the interest in "bags" with respect to the other users of the visual level "1" or over having even a little bit the interest in the "bags".

In this manner, according to this embodiment, the figure of the model in the visual space about the items is differently displayed corresponding to the visual level established in a certain item. In other words, how the model is seen is different corresponding to the degree of interests for the item of a certain user. Specifically, if the user is interested in a certain item, it is displayed whether or not the model displayed on the screen has the interests about the item. The higher the degree of the interests is, the more finely the degree of the interests of the model having the interests about the item is displayed. Furthermore, in the case where the user is not entirely interested in a certain item, the information whether or not the model displayed is interested about the item is not displayed.

Accordingly, the user can find out readily the model having the analogous interests from a plurality of models in the virtual space displayed on the screen. The user approaches the own model in the virtual space to the found model, and can communicate with the user of the model via a chat, etc.

Incidentally, how the model is seen is single-significantly defined by determining how to see. According to this embodiment, the higher the visual level of the model is, the more strongly the user can appeal the interests about the item. Furthermore, inversely, how the model is seen is determined, so that how to see the model is single-significantly defined.

Figures 9, 10:
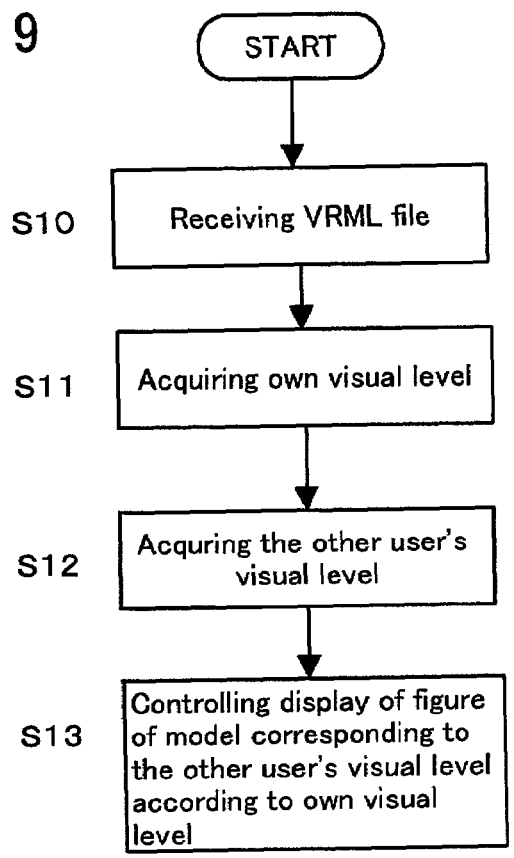
FIG. 9 is a flowchart of display control according to this embodiment.
FIG. 10 is an example of a screen of a sales registration.

The display control by settings of the above visual levels is executed by the VRML browser 21 of the terminal 20. FIG. 9 is a flowchart of the display control by the VRML browser 21 according to this embodiment. In FIG. 9, the VRML browser 21 receives a VRML file from the server 10 (S10). The VRML browser 21 analyzes (own) information of the user principal seeing the screen of the terminal 20, and acquires the visual level established in each item (S11). Furthermore, the VRML browser 21 analyzes information of the other user of each model existing in the display range, and acquires the visual level established in the model of the other user in each item (S12). The VRML browser 21 displays the figure of the model corresponding to the visual level of the other user in each item based on the visual level of the own model in accordance with FIG. 8.

Incidentally, in the case where the own model is displayed on the screen by switching a visual point, the own model is seen at the visual level per se in how to see in the case where the visual level at a seeing side is same with that at a side which is seen. For example, if the visual level of the own model is "2", the model at the visual level "2" is seen in how to see the model at the visual level "2".

Returning to FIG. 7A, the user sets the visual level about the item "bags" in accordance with the above description. Furthermore, in the case where the user establishes the visual level at "2" or over, the user selects "position of icon" in FIG. 7A, and selects the position where the icon of the bags is displayed. When the user clicks "position of icon", the window of FIG. 7B is displayed. When the user selects "have by a left hand" or "have by a right hand" in FIG. 7B, the icon of the bag is displayed so that the own model has it by its left hand or right hand. Furthermore, when the user selects "replace with head", a head part of the own model is changed to an icon of a bag.

Furthermore, a type of bags may be selected. When the user clicks "select bags", the window of FIG. 7C is displayed. In FIG. 7C, a plurality of types of bags such as a handbag, a shoulder bag, a Boston bag, and the like can be selected. Thus, it is possible to transmit to the other user which type of bags the user is interested in.

Furthermore, a brand of bags may be selected. When the user clicks "tie-up brand" of FIG. 7C, the window of FIG. 7(d) is displayed. In FIG. 7(d), a name of brand tying up with the virtual space in the Internet is displayed. The user selects a favorable brand. Thus, the bag having a design of the selected brand can be displayed. Incidentally, in the case where the brand is selected, as described later, accounting may be performed with respect to the user.

Furthermore, in FIG. 7A, when the user selects "non-display of bags", it is possible to non-display during the selection period even in the case where the bag is intrinsically displayed.

As described above, the case where the item of hobbies or interests is "bags" was explained as an example, the present invention is similarly applied on the other items. For example, in the case where the item is "tennis", the model having a tennis racket is displayed corresponding to the visual level. Furthermore, in the case where the item is "Chinese noodles", the model of which a head is replaced with a Chinese noodles porcelain bowl is displayed. Justly, the model having a Chinese noodles porcelain bowl by a left hand or right hand may be displayed.

Next, "sales" in the visual space will be explained. The users having various purposes participate in the virtual space. Merely, the case is not limited to a case where the user desires to find out another user having the same hobbies or interests, and it is assumed that a user (hereinafter referred to as a salesman) having the purpose of selling any goods or services to an encountered user enters. Then, according to this embodiment, the virtual space has been in advance set as a space where the user can sell, and various services for selling are provided.

The salesman may search for the model of the user (hereinafter referred to as a sales target user) who is interested in a sales target as a general spectator, while moving in the virtual space. Normally, the salesman desires to find out the sales target user in a short time as many as possible. However, as the interior of the virtual space is wide, it is difficult to encounter the many sales target users in a short time.

Then, according to this embodiment, there is provided extracting means described below as services for the salesman. By using the extracting means, only the sales target model is extracted, and only the extracted model is displayed in the virtual space of the screen on which the salesman is seeing. Furthermore, by using the extracting means, the sales target user is extracted, and a list of extracted users is prepared, and the list is displayed. One of the listed-up users is designated by predetermined operation, thereby leading to a state of communicating with the designated user (for example, a chat, an electronic mail).

On the other hand, as services for general users which are to be sold from the salesman, the user can establish a sales level. The sales level is a level in permission or prohibition of contact from the salesman, and is established in each item. The sales level is established on the screen of FIG. 7A. An initial setting is "0".

The sales level is, for example, assorted into six stages as shown as follows:

| sales level | contents |
| --- | --- |
| 0 | reject sales completely |
| 1 | permit to contact or list-up under receiving margin |
| 2 | permit to contact under receiving margin |
| 3 | permit to list-up under receiving margin |
| 4 | permit sales under no conditions |
| 5 | desire to contact |

The sales level "0" is a level in the case where selling from the salesman is completely rejected. For example, even in the case where a certain user establishes the vertical level about the item "bags" relatively high, when the sales level of the item "bags" is set as "0", in the case where the salesman of the bags displays by extracting the model of the higher visual level of the bags by using the extracting means, the user's model is not displayed on the screen which the salesman is seeing. Furthermore, it is not listed even in the preparation of the list.

The sales level "1" is a level in which, in the case where the salesman uses the extracting means, and a contact with the salesman is permitted, and further a listing is permitted, under conditions that the general user receives a margin from the salesman.

The margin is, for example, points (the number of points) passing in the virtual space. The general user and salesman (namely, all the users) can purchase in advance points of the arbitrary number of points. The number of points owned by each user is registered in each user in the user registration file 15 of the server 10 as user information. The points can be utilized as, for example, money when the user does the shopping in the shopping mall in the virtual space. Furthermore, the points may be money-replaceable.

In this manner, an incentive is given to the general users who are sales targets of the salesman so as to get money, thereby promoting to be the sales target. Thus, it is possible to expect an increase in the number of sales targets. Furthermore, as the salesman can encounter many sales target users in a short time, even if the user pays more or less expenses, it is possible to sell effectively.

In the case where the salesman contacts with the general users of the sales level "1", or lists them by the extracting means, the server 10 subtracts the predetermined number of points from the points of the salesman, and adds them to the points of the general users. For example, the number of points subtracted at one time contact is the number of points relevant to ¥10, and the number of points subtracted in one time listing is the number of points relevant to a value of the number of general users at the sales level "1" out of the listed general users x ¥1. In the case of the listing, the number of points relevant to ¥1 is added to each user.

The sales level "2" is a level in the case where a margin is demanded to only the listing. Furthermore, the sales level "3" is a level in the case where a margin is demanded to only the contact. Furthermore, the sales level "4" is a level in the case where the selling is accepted unconditionally. The salesman can contact with or list the general users of the sales level "4" without paying the margin. Furthermore, the sales level "5" is a level in the case where the general user side desires to contact with the salesman positively. At this sales level "5" also, a payment of the margin is not required.

Succeedingly, a sales registration will be explained. The sales registration has been in advance registered for sales activities utilizing the extracting means in the virtual space. First, when the user clicks "sales registration" on the screen of FIG. 4, a sales registration screen of FIG. 10 is displayed. On the registration screen of FIG. 10, a dealer (company) which desires to sell is registered. According to this embodiment, in order to prevent the general users from being troubled by wicked selling in the virtual space, the belonging company as a character of the salesman has been previously registered. On the registration screen of FIG. 10, a name of company, an address, a telephone number, a name of a representative, a sales target item, and the like are input, and the input data are transmitted to the server 10. The input data are subjected to a predetermined examination by a manager for managing the server 10. In the case where the input data pass the examination, an ID and password for the company are issued, and are notified to the address of company by a mail, or the like. The responsible salesman of the company transmits the notified ID and password to each salesman. Thus, the salesman can use the extracting means to be explained below in the sales activities in the virtual space.

Incidentally, even in the sales registration, in the same manner as in the general registration, setting of the visual level is performed. Thus, the screen which the salesman is seeing is also controlled to display based on the above visual level. However, in order to distinguish between the model of the general user in the visual space and the model of the salesman, for example, cloths of the model of the salesman are limited to a business suit, or the like, so that it may be possible to distinguish between the model of the general user and the model of the salesman.

The salesman selects, for example, "extraction display" from a pull-down menu of "sales" of a menu bar of the screen of the virtual space of FIG. 2. Incidentally, "sales" of the menu bar become active only on the screen of the virtual space corresponding to the ID and password sales-registered. When "extraction display" is selected, an extraction level setting window of FIG. 11 is opened on the screen of the virtual space.

In the extraction level setting window of FIG. 11, the salesman inputs a sales target item and extraction level. All or any of items registered beforehand are input to the sales target item.

The extraction level is a visual level of the model which the user desires to display on the screen. The establishable extraction levels are "1" to "5". For example, when the extraction level about the item "bags" is set as "3", only the model having the visual level "3" in "bags" is displayed. Furthermore, a plurality of extraction levels can be selected. For example, when the user selects the extraction levels "3", "4", and "5", the models of the visual level "3" or over are displayed.

Furthermore, in the extraction level setting window of FIG. 11, it is possible to set a sales level of the sales target model to the extraction conditions. As the initial setting, for example, all the sales levels are set in the extraction range. In the case where the salesman, for example, does not desire to contact with the sales target user which is accounted in contact, the sales levels "1", "3" are excluded from the extraction conditions. Thus, it is possible to display only the model of the sales target user which is not accounted.

Figure 12:
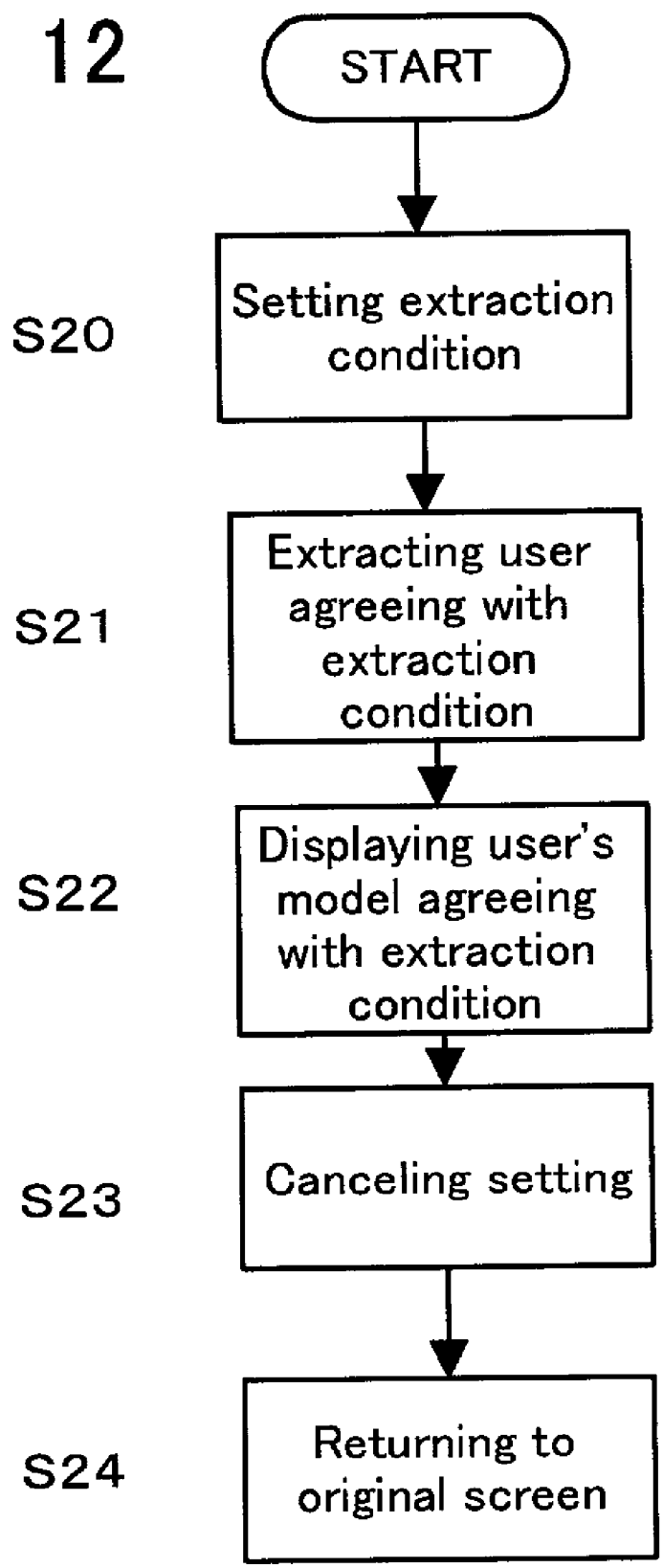
FIG. 12 is a flowchart of extraction display control.

The above control of extraction display is executed by the VRML browser 21 of the terminal 20. FIG. 12 is a flowchart of controlling the extraction display by the VRML browser 21. In FIG. 12, when the above extraction conditions such as an extraction level in predetermined items, or the like are established (S20), the VRML browser 21 retrieves the VRML file, and extracts the user agreeing with the extraction conditions (S21). The VRML browser 21 does not display the model of the user not agreeing with the extraction conditions, and only the model of the extracted user is displayed in the virtual space (S22). Furthermore, at step S23, when the above setting is canceled, return to the original screen (a screen on which all the models existing in a display range are displayed) (S24).

Accordingly, the salesman can save a labor of searching for the sales target user from the plurality of models existing in the virtual space, and can encounter many sales target users in a short time.

Furthermore, when the user selects "preparation of list" from a pull-down menu of "selling" of the menu bar on the screen of the virtual space of FIG. 2, a list preparation window of FIG. 13 is opened on the screen.

In the list preparation window of FIG. 13, in the same manner as in the extraction level setting window of FIG. 11, a sales target item and an extraction level, and further a range of a sales level are established. In the case where the sales target user requiring the margin for a listing is desired to exclude, the sales levels "1", "2" are taken off from the extraction conditions.

Figure 14:
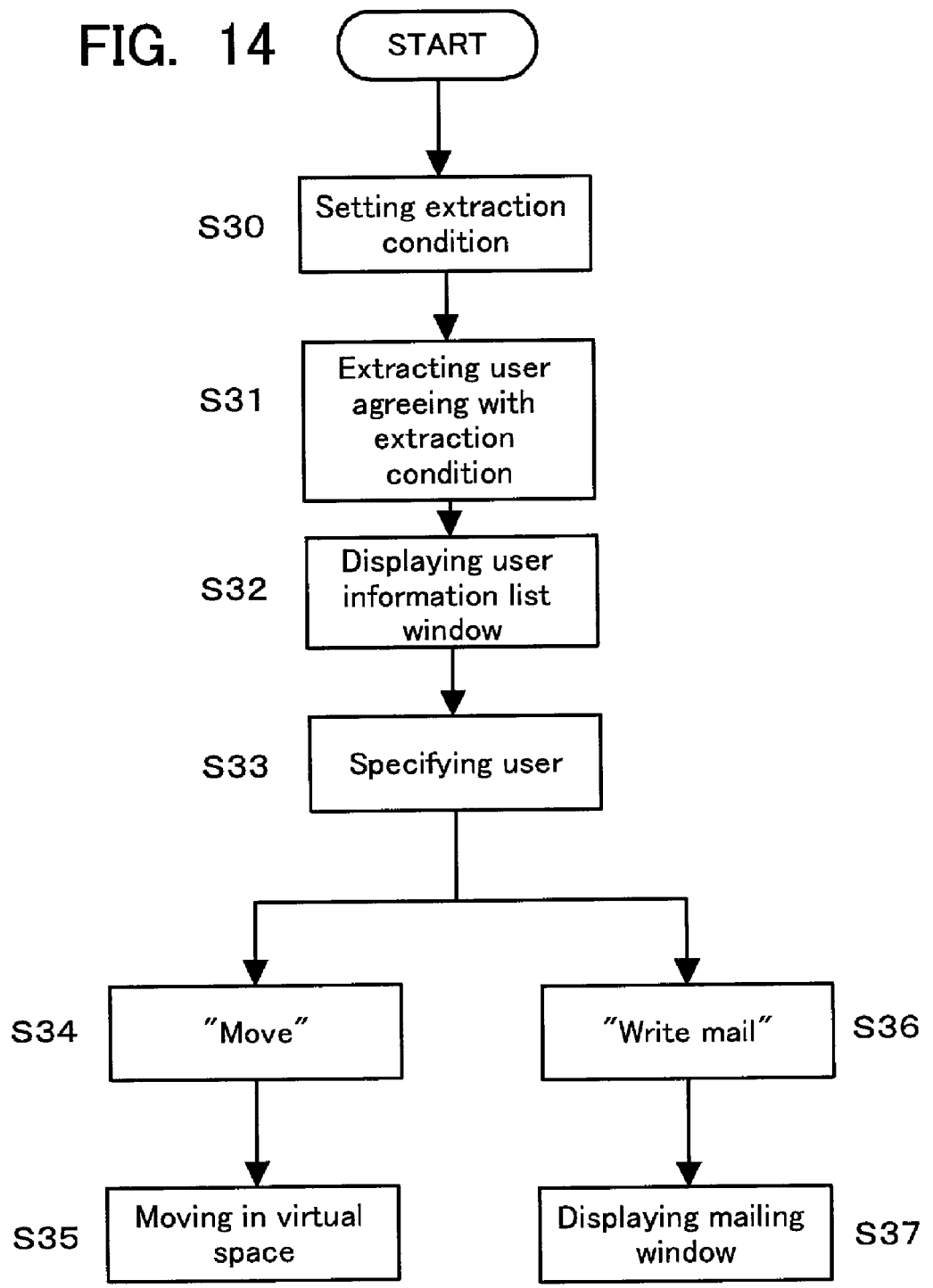
FIG. 14 is a flowchart of a list preparation.

FIG. 14 is a flowchart for a list preparation by the VRML browser 21. When the extraction conditions such as an extraction level or the like in a predetermined item are established (S30), in the same manner as in "extraction display control", the VRML browser 21 of the terminal 20 retrieves information of all the models included in the VRML file, and extracts users agreeing with the extraction conditions (S31). The VRML browser 21 prepares the list of information of the extracted user, and displays it on the user information list window (S32).

FIG. 15 is an example of the user information list window. In FIG. 15, a name (name of the model) in the virtual space of the extracted user, a visual level, a sales level, and the like are displayed in the user information list. The salesman designates the user whom the salesman desires to contact with, by a predetermined operation (S33). The salesman selects a method for communicating with the designated user. For example, in the case where the salesman desires to contact in the virtual space, the salesman clicks "move" (S34). Then, the VRML browser 21 moves a coordinates position in the virtual space of the model of the salesman to the coordinates position where the model of the designated user exists, (or a position adjacent thereto) (S35). Thus, the salesman can communicate with the designated user by the chat, or the like.

Furthermore, when the salesman clicks "write mail" (S36), a mail window into which a mail address of the designated user is input is opened (S37). The salesman enters the mail for selling and transmits it.

In this manner, the model agreeing with the predetermined extraction conditions can be extracted from the plurality of models existing in the virtual space, whereby the salesman can encounter the plurality of sales target users in a short time. Furthermore, the salesman utilizes the above extraction means for pay, and each time the salesman utilizes the extraction means, for example, the predetermined number of points is subtracted from the points of the salesman. Alternatively, the predetermined sum may be dissaved from a predetermined deposit account.

Furthermore, according to the embodiment of the present invention, each user can set the visual level in the plurality of items. For example, it is assumed that a certain user establishes the visual levels of bags, Chinese noodles, and tennis, and establishes so as to have a bag by a right hand, and have a tennis racket by a left hand in a display position of their items icon (icon position), and establishes so as to replace a porcelain bowl of Chinese noodles with a head. The such-established user's model is seen as shown in FIG. 16A from the other models establishing the visual levels of "1" or over in all the above three items (and is displayed on the terminal screen which is being viewed by the other model's user). In this manner, in the case where the display positions of the item icons corresponding to each item are not overlapped, the item icons of all the items can be displayed, but the case where the display positions are overlapped is assumed. For example, the case where both the bag and tennis racket are established so as to have them by a left hand.

In such the case, it is necessary that an upper and lower sides relationship is given to overlapping of the bag and tennis racket. In order to determine the upper and lower sides relationship in a depth direction of the overlapped item icons, the VRML browser 21, for example, uses the following calculation formula to acquire a priority P in each item.

$$P=(\text{own visual level})\times 10+(\text{mate's visual level})$$

According to the above calculation formula, the items having higher mutual visual levels are displayed preferentially above, and further (own visual level) is higher in specific gravity than in (the other user's visual level). In descending order of the priorities P acquired by the above calculation formula, the upper and lower sides relationship of the item icons is determined. The item icons are displayed above from those having the larger priorities P.

For example, the priorities P are indicated under the following conditions.

EXAMPLE 1

Item "tennis" Visual Level
Own level "4", the other level "2"
P=42
Item "bags" Visual Level
Own level "3", the other level "5"
P=35

Accordingly, the tennis rackets are displayed above the bags (refer to FIG. 16B). In this manner, in the case where the own visual level is different, the upper and lower sides relationship is determined according to a magnitude of the own visual levels regardless of the other user's visual levels.

EXAMPLE 2

Item "tennis" Visual Level
Own level "2", the other level "3"
P=23
Item "bags" Visual Level
Own level "2", the other level "4"
P=24

Accordingly, the bags are displayed above the tennis rackets (refer to FIG. 16C). In this manner, in the case where the own visual level is same, the upper and lower sides relationship is determined according to a magnitude of the other visual levels.

The calculation formula of the priority P is not limited to the above formula. A multiple to be multiplied by (own visual level) has only to be a sufficient digit for increasing the specific gravity of the own visual level (for example, even about 5 is sufficient). Furthermore, (own visual level) and (the other user's visual level) may be the calculation formula of the equivalent specific gravity, or may be the calculation formula of increasing the specific gravity of (the other user's visual level). In either case, the above priority P is calculated whereby the item icons in which interests of both the users are higher can be displayed in sequence from above. Incidentally, in the case where the priorities P agree with each other, they are displayed at random.

Furthermore, according to the embodiments of the present invention, in the case where the terminal 20 is a computer gaming apparatus of a game arcade, the user casts coins into the gaming apparatus, whereby an entry into the virtual space becomes possible in a predetermined time. Furthermore, a prepaid card recording the above points may be able to use. The user inserts the prepaid card into the gaming apparatus instead of coins. The gaming apparatus permits to enter into the virtual space in a time in proportion to the number of read points. Accordingly, the user records the points obtained by the selling from the salesman in the prepaid card during the entry into the virtual space, so that the number of points can be increased.

Furthermore, the above embodiment was explained in the case where the display control based on the visual level is executed by the VRML browser 21 of each terminal 20, but may be executed by the controller 11 of the server 10. In this case, the controller 11 forms separate VRML file in each user, and transmits it to each user. The VRML browser 21 of the terminal 20 displays the VRML file received as it stands.

Furthermore, according to the above embodiment, the extraction means is not limited to the permitted salesman, but may be presented by the user receiving a specified permission from the server. For example, the user receiving the specified permission other than the salesman is a user searching for a person for raising a member of a circle.

Furthermore, the models other than the models as substitutes of the users may exist. Namely, at least one model corresponding to a virtual character presented by the server has in advance existed in the virtual space. The virtual characters are, for example, a policeman for showing the way, a pet animal, or the like.

Second Embodiment

Next, a second embodiment of the present invention will be explained. According to the second embodiment, a love romance simulation game using the model of a virtual character (presented by the server) existing in the virtual space is presented.

Figure 17:
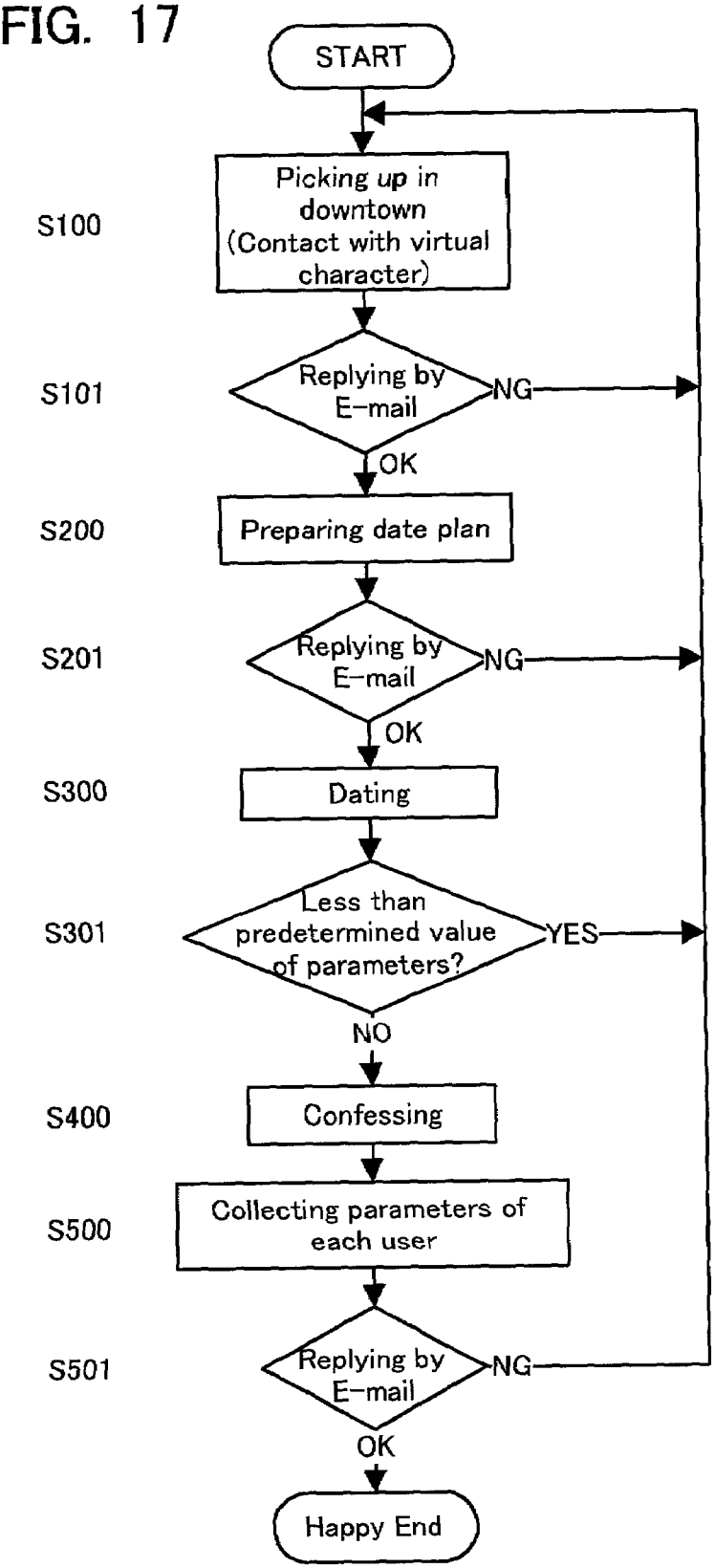
FIG. 17 is a schematic flowchart of a game flow according to an second embodiment.

FIG. 17 is a schematic flowchart of a game flow according to the second embodiment. The virtual character in the virtual space (downtown) is, for example, a girl. At least one girl model exists. At step S100, the user searches for the model of the virtual character in the virtual space, and makes the own model contact with the model, and communicates with the virtual character. The virtual character is, for example, a girl, and the user picks up the girl's model in the virtual space. The virtual character holds favorable impressive degree parameters for the user, and when the virtual character contacts with the user's model, the user ID is authenticated and a choice menu group relevant to a talk with the user is provided.

Figure 18:
FIG. 18 is a screen example of "pick-up in downtown" at step S100.

FIG. 18 is a screen example of "pick-up in downtown" at step S100. The user makes conversations with the virtual character contacted by selecting the presented choice menu group. The virtual character returns a reaction corresponding to the selected items.

When the conversations are ended, the favorable impressive degree parameters of the virtual character fluctuate according to contents of the items selected by such user in the conversations. These fluctuated favorable impressive degree parameters are not directly presented to the user. The favorable impressive degree of the character to the user is determined based on the fluctuation amount, and the corresponding electronic mail is automatically formed, and is transmitted to such user. At step S101, when the favorable impressive degree is high, the user receives the electronic mail of OK, and can proceed to next step S200, and when low, the user receives the electronic mail of NG, and does over again from step S100.

At step S200, based on the reaction returned by the virtual character in the conversations with the virtual character at step S100, the user selects an arbitrary item from the choice menu group presented (date plan) and prepares a date plan.

Figure 19:
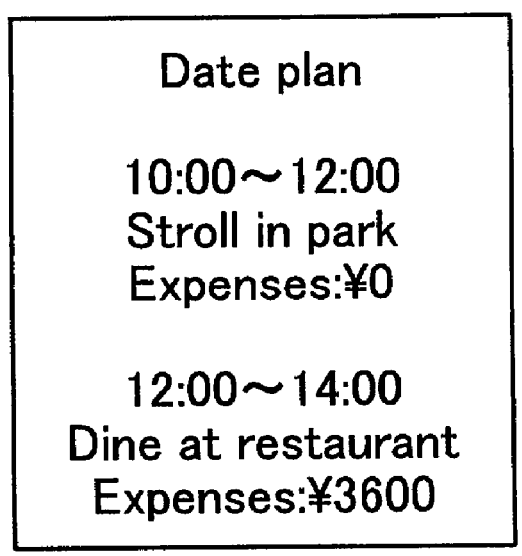
FIG. 19 is a screen example of "date plan preparation" at step S200.
Figure 20:
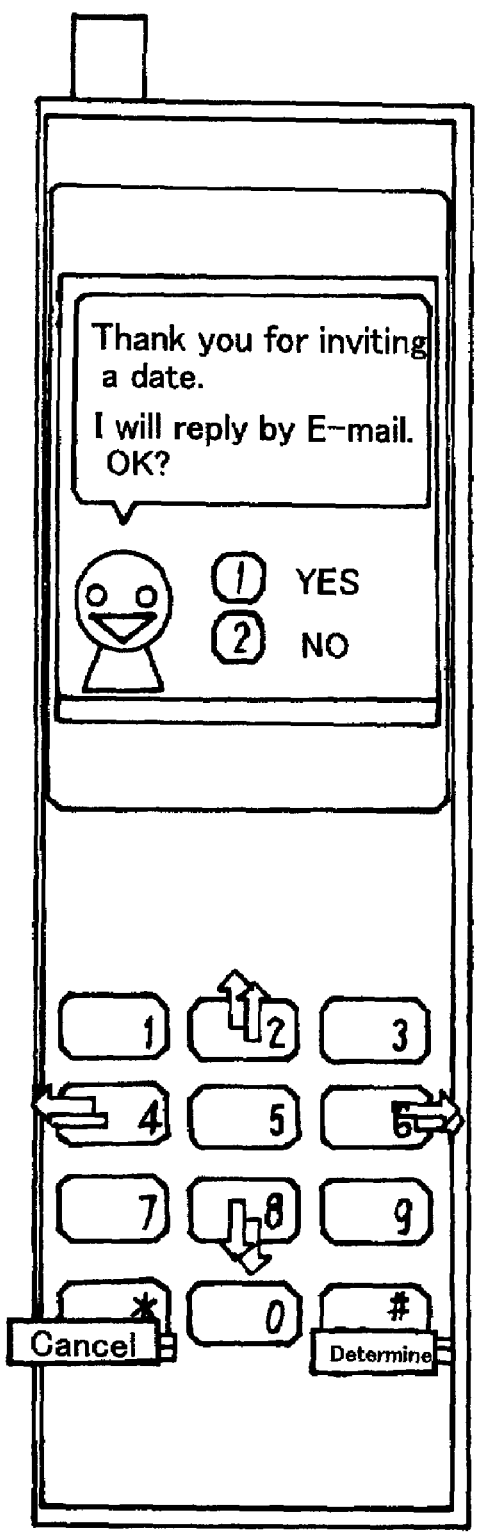
FIG. 20 is a screen example of "date plan preparation" at step S200.

FIGS. 19 and 20 are screen examples of "date plan preparation" at step S200. When the user prepares the date plan as shown in FIG. 19, the user contacts again with the virtual character, and presents the date plan. When presenting the date plan, the screen of FIG. 20 is displayed. Incidentally, the date plan is prepared within the scope of money in hand in currency passing in the virtual space in which the user possesses. Furthermore, the screen of FIG. 20 is an example of the case where the terminal of the user is a portable telephone which can be communicated in the Internet.

The virtual character fluctuates the favorable impressive degree parameters for such user based on the item contents of the presented date plan. Based on the fluctuation amount, a response mail of the date OK/NG is automatically generated for such user, and is transmitted to such user. At step S201, if the response mail is OK, the user can proceed to step S300, and if NG, the user does over again from step S100. Incidentally, in the case of NG, the virtual character may hold the current favorable impressive degree parameters for such user, or may erase them.

At step S300, the user practices the date with the virtual character. The server generates a date scenario based on the date plan at step S200, and presents it to the user.

Figure 21:
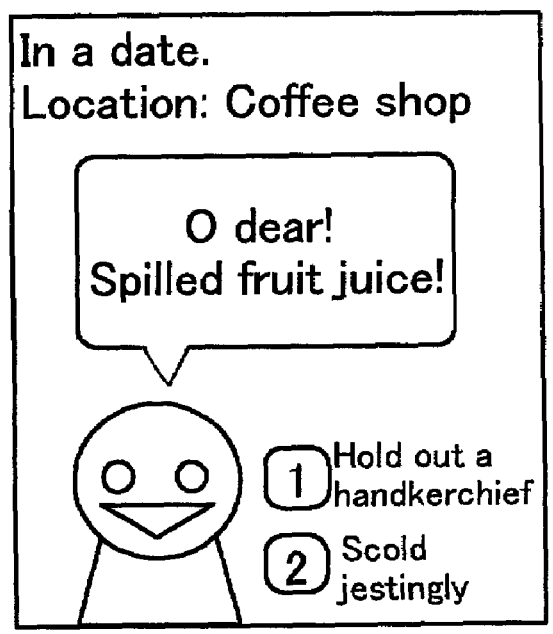
FIG. 21 is a screen example of "date practice" at step S300.

FIG. 21 is a screen example of "date practice" at step S300. The user advances the date by selecting the arbitrary item from the choice menu group presented along the scenario. The choice menu group is presented a plurality of times during the date, and the favorable impressive degree parameters of the virtual character fluctuate in each selection. At step S301, when the favorable impressive degree parameters become less than a predetermined value, a progress of the scenario is discontinued, and does over again from step S100. In the case of discontinuation of the scenario, the virtual character may hold the present favorable impressive degree parameters for such user or may be erased.

Figure 22:
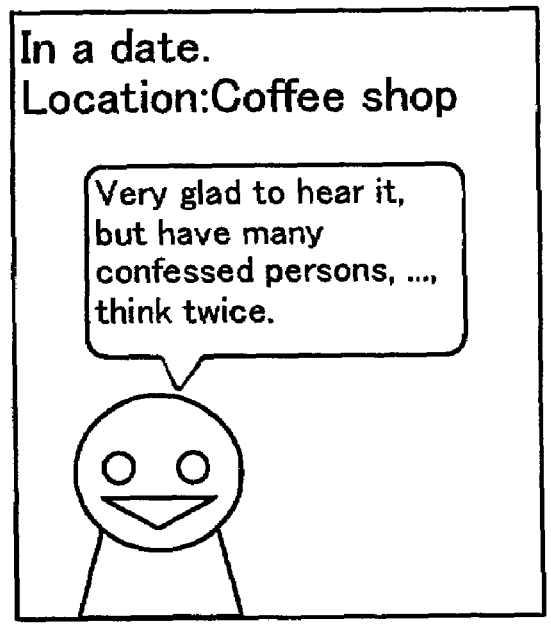
FIG. 22 is a screen example of "confession" at step S400.

In the case where the scenario progresses until the end, at step S400, the user enables to "confess" to the virtual character. FIG. 22 is a screen example of "confession" at step S400. The date is ended by the user's "confession". The virtual character holds the favorable impressive degree parameters of such user when the date is ended.

At step S500, the server totalizes the favorable impressive degree parameters of each user which are held by the virtual character in each predetermined period (for example, one week). At step S501, the server generates the electronic mail of OK for "confession" and transmits (informs) it to the user having the highest favorable impressive degree parameters, and transmits (informs) the electronic mail of NG to the other users.

In this manner, in the game according to the second embodiment of the present invention, the plurality of users can contact with a single virtual character. The virtual character holds parameters of each user. According to the progress of the game with each user, the parameters of each user fluctuate, and are compared with each other, and the user having the maximum parameters will be a winner.

Incidentally, according to the above second embodiment, the virtual character may be displayed on the display unit of the terminal as one existing in the virtual space, and a plane image of the virtual character may be displayed on the display unit of the terminal.

Furthermore, the terminal of the user according to the above second embodiment is, for example, one of a portable telephone which can be communicated in the internet, and the virtual character and various pieces of information about the game may be displayed on the display unit (a crystal liquid monitor).

Hereinabove, according to the present invention, it is possible to find out the user having the same hobbies and interests, or the user as the sales target readily and in a short period of time from a multiplicity of users entering into the virtual space.

The protective scope of the present invention is not limited to the above embodiments, and extends to the present invention described in the claims for a patent and the equivalents.

What is claimed is:

1. An information display method for displaying information about a plurality of users registered in a server, on a terminal of a specific user of the plurality of users, via a network, the method comprising the steps of:

transferring registration information about the plurality of users from the server to the terminal of the user; and displaying at least one graphical model within a virtual space on the terminal of said specific user, each of said at least one graphical model being associated with a respective one of said plurality of users and including at least one graphical figure representing an item of interest and being associated with an interest level of said respective one user in the item, the display of said model being responsive to registration information of said respective one user and to registration information of said specific user, and the display of each of said at least one figure being responsive to a comparison of registration information of said respective one user relating to said interest level in said item and registration information of said specific user relating to said interest level in said item.

2. The information display method according to claim 1, wherein the registration information about the plurality of users is retrieved according to predetermined extraction conditions set by the specific user so that a user satisfying the extraction conditions is extracted.

3. The information display method according to claim 2, wherein the model corresponding to an extracted user is displayed, and the model corresponding to an unextracted user is not displayed.

4. The information display method according to claim 2, wherein the information about at least one extracted user are displayed as a list.

5. The information display method according to claim 4, wherein the extracted user is able to charge to the specific user for displaying the list including the information of the extracted user.

6. The information display method according to claim 2, wherein the specific user is able to set the extraction conditions in the case where the specific user has in advance a specified permission from a manager of the server.

7. The information display method according to claim 2, wherein the specific user is able to set the extraction conditions in the case where the specific user has in advance a permission of sales activities within the virtual space from the manager of the server.

8. The information display method according to claim 2, wherein the manager of the server charges to the specific user for the setting of the extraction conditions by the specific user.

9. The information display method according to claim 2, wherein an extracted user is able to charge to another user communicating with the extracted user within the virtual space.

10. An information display system comprising:

a server for registering information about a plurality of users, and at least one terminal connected to the server via a network, the terminal being of a specific user of the plurality of users for displaying models responsive to registration information about the plurality of users, wherein the server transfers the information about the plurality of users to the terminal of the user, and the terminal of the user displays at least one graphical model within a virtual space on the terminal of said specific user, each of said at least one graphical model being associated with a respective one of said plurality of users and including at least one graphical figure representing an item of interest and being associated with an interest level of said respective one user in the item, the display of said model being responsive to registration information of said respective one user and to registration information of said specific user, and the display of each of said at least one figure being responsive to a comparison of registration information of said respective one user relating to said interest level in said item and registration information of said specific user relating to said interest level in said item.

* * * * *